(12) United States Patent
Lazrek et al.

(10) Patent No.: US 12,423,129 B2
(45) Date of Patent: Sep. 23, 2025

(54) CLOUD MANAGEMENT OF CUSTOMER-CREATED APPLICATIONS

(71) Applicant: Microsoft Technology Licensing, LLC, Redmond, WA (US)

(72) Inventors: Mustapha Lazrek, Clamart (FR); Soufiane Loukili, Bellevue, WA (US); Sacha Kley, Paris (FR); Paul Dib, Issy-les-Moulineaux (FR)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 18/056,423

(22) Filed: Nov. 17, 2022

(65) Prior Publication Data
US 2024/0168789 A1    May 23, 2024

(51) Int. Cl.
*G06F 9/455* (2018.01)

(52) U.S. Cl.
CPC .. *G06F 9/45558* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 9,372,735 B2 | 6/2016 | Calder et al. | |
| 10,104,053 B2 | 10/2018 | Wipfel et al. | |
| 10,135,679 B2 | 11/2018 | Huang et al. | |
| 10,469,411 B1 * | 11/2019 | Patel | G06F 3/061 |
| 10,761,893 B1 * | 9/2020 | Bhadauria | G06F 9/5044 |
| 10,783,472 B2 | 9/2020 | Carpenter et al. | |
| 10,990,440 B2 | 4/2021 | Botelho | |
| 11,010,193 B2 | 5/2021 | Karanasos et al. | |
| 11,237,864 B2 | 2/2022 | Botelho | |
| 11,281,393 B2 | 3/2022 | Abdul Rasheed et al. | |
| 11,429,424 B2 | 8/2022 | Lu et al. | |
| 2019/0391883 A1 | 12/2019 | Wang et al. | |
| 2020/0310853 A1 * | 10/2020 | Featonby | G06F 9/45558 |
| 2021/0065095 A1 | 3/2021 | Delellis et al. | |
| 2021/0173694 A1 | 6/2021 | Hildebrand et al. | |

(Continued)

OTHER PUBLICATIONS

"Meet your New SaaS Workforce", Retrieved From: https://www.uipath.com/product/automation-cloud-robots, Retrieved on: Oct. 14, 2022, 5 Pages.

(Continued)

*Primary Examiner* — Adam Lee
(74) *Attorney, Agent, or Firm* — Holzer Patel Drennan

(57) ABSTRACT

A method for configuring virtual machines to support workloads performed by customer-created applications includes provisioning a first and second subsets of virtual machines (VMs) in a customer VM group based on a first and second customer-specified VM images. Workloads of a first type are allocated to select VMs in the first subset of VMs and workloads of a second type are allocated to select VMs of the second subset of VMs. In response to detecting a shift in a ratio of a number of queued workloads of the first type and of the second type, a select number of VMs are de-provisioned from the first subset of the customer VM group and the select number of VMs re provisioned, based on the second VM image, for addition to the second subset of the customer VM group.

20 Claims, 6 Drawing Sheets

(56) References Cited

U.S. PATENT DOCUMENTS

| | | |
|---|---|---|
| 2021/0173719 A1 | 6/2021 | Chester et al. |
| 2021/0288970 A1* | 9/2021 | Chawla .................. H04L 67/55 |
| 2022/0147390 A1* | 5/2022 | Akinapelli .......... G06F 11/3433 |
| 2022/0197249 A1* | 6/2022 | Ma ...................... G06F 9/45558 |

OTHER PUBLICATIONS

"Virtual Machine (VM) Processor and Resource Allocation Guide", Retrieved From: https://www.dnsstuff.com/virtual-machine-resource-allocation, Jul. 22, 2021, 11 Pages.

Garg, et al., "SLA-based Virtual Machine Management for Heterogeneous Workloads in a Cloud Datacenter", In Journal of Network and Computer Applications, vol. 45, Oct. 2014, pp. 108-120.

International Search Report and Written Opinion received for PCT Application No. PCT/US2023/035457, mailed on Jan. 29, 2024, 17 pages.

Jaspreet et al., "Cloud Resource Management Optimization: Taxonomy and Research Challenges", Institute of Electrical and Electronics Engineers, Jun. 4-5, 2020, pp. 1133-1138.

International Preliminary Report Patentability received for PCT Application No. PCT/US2023/035457, mailed on May 30, 2025, 10 pages.

\* cited by examiner

CLOUD MANAGEMENT OF CUSTOMER-CREATED APPLICATIONS

BACKGROUND

Many companies, such as Microsoft Azure, Amazon Web Services, and Google Cloud, provide cloud-hosted virtual machine (VM) services that allow customers to lease virtual machines with customer-specified hardware and software characteristics such as CPU power, RAM, operating system type, and more. With increasing popularity, third party application providers are providing integrations that allow their web-based applications to execute on cloud-hosted virtual machines. Due to the associated convenience and costs savings, enterprises are rapidly leveraging available opportunities to migrate routine processing operations to the cloud.

However, not all applications can be easily migrated to cloud-based resources. Customer-created applications, such as applications created using Microsoft Power Automate® and other application creation tools, are not easily migrated to the cloud because these applications are designed by customers and intended to operate within computing environments that may be highly-specific to those customers, such as by relying on particular types of hardware and software resources used by the company that have access to the company's network and stored data resources.

SUMMARY

According to one implementation, a disclosed method facilitates cloud management of customer-created applications. The method provides for provisioning a first subset of virtual machines (VMs) in a customer VM group associated with a customer account based on a first VM image specifying a first set of software and hardware characteristics and provisioning a second subset of VMs in the customer VM group based on a second VM image specifying a second set of software and hardware characteristics. The first VM image defines aspects of a first target runtime environment for a first type of customer workload and the second VM image defines aspects of a second target runtime environment for a second type of customer workload. The method further provides for selectively allocating, from a customer queue associated with the customer account, workloads of the first type to select VMs in the first subset of VMs and workloads of the second type to select VMs of the second subset of VMs; and detecting a shift in a ratio of a number of queued workloads of the first type and of the second type in the customer queue. In response to detection of the shift, the method provides for de-provisioning a select number of VMs from the first subset of VMs in the customer VM group and provisioning the select number of VMs for addition to the customer VM group based on the second VM image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

Figure 1:
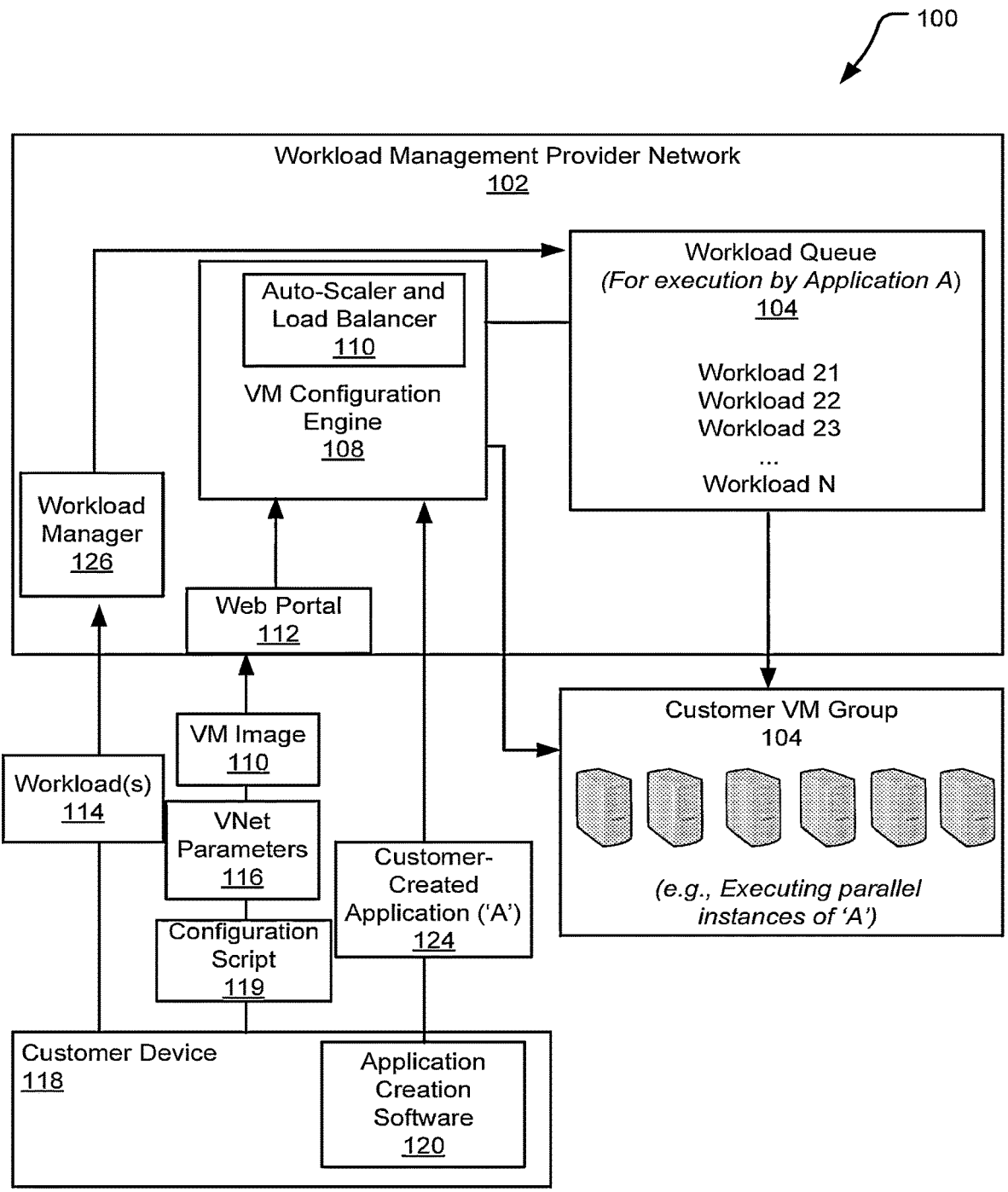
FIG. 1 illustrates an example of a system that provides dynamic autoconfiguration and autoscaling services for supporting workloads of customer-created applications on cloud resources.

In recent years, some application providers have begun to offer software that allows customers to create their own applications. One example of a customer-created application is an application that is created through a third-party development platform, such as Microsoft Power Automate, that provides a web-based API for automating tasks in customer workflow. Using this platform or other tools providing similar services, a customer can automate a sequence of tasks ordinarily performed by a person interacting with a computer and a plethora of applications and/or resources accessible to that computer. For example, the customer may define an application called "invoice processing" that receives as input a sales invoice and that performs a sequence of operations on the sales invoice, defined by the customer, that would traditionally be performed manually by an employee. Other customer-created applications may perform an extensive variety of tasks, some requiring access to enterprise resources.

Some enterprises that make wide-use of process automation software may devote significant IT resources to configuring machines to handle high-volume workloads, such as tasks performed repeated with different inputs (e.g., order submission, invoice processing, payroll), some of which may vary in volume seasonally. Configuring each machine can, in some cases, take 30 minutes to several hours. Locally maintaining a fleet of machines to perform such processes can be labor intensive, requiring IT personnel to perform frequent fleet-wide software updates. Given the above considerations, the ability to off-load some or all of these tasks to cloud-based resource providers would be very beneficial to most of these enterprises.

However, configuring a virtual machine to execute a customer-created application is a non-trivial task that may, for example, entail actions such as (1) obtaining a VM with hardware and an operating system matching the customer's compute environment; (2) actions to install various applications on the VM that the customer also has locally installed; (3) actions to configure the VM to use applicable APIs to talk to application server(s) for one or more of those applications; (4) configuring the VM for access to the customer's existing virtual network, and more. Even assuming, inuendo, that the customer has the resources and skill set to perform the above operations, there are significant cost considerations relating to how many VMs the customer should configure for such purposes. Cost scales in proportion to the number of VMs leased, and the customer's workload demands may vary at different times of year. For all of the above reasons, it is labor-intensive and costly to migrate the workloads of customer-created applications to cloud resources.

In limited scenarios where the enterprise does have the sophistication and/or third-party resource support to migrate such workloads to cloud-based virtual machines, it is still labor intensive to configure each VM manually. For types of workloads that vary seasonally, locally-configured or cloud-hosted resources may either go unused at certain types of year or else IT personnel may have to perform time-consuming actions to decommission such machines to allow the machines to be freed up and/or repurposed during such times.

The disclosed technology provides systems and methods that facilitate migration of customer-created applications to cloud-based virtual machines (VMs), for automatically scaling the size of a customer's cloud-based VM group, and for load-balancing workloads of different types among the VMs of the customer's VM group in response to variations in the customer's workload queue (e.g., number of queued jobs, number of queued jobs for different workload types).

In the disclosed implementations, "auto-scaling" the number of machines in a customer VM group more than just re-allocating existing VMs (e.g., from one customer to another) because the workloads being supported by the VMs are highly-dependent upon individual customer hardware and software configurations. Consequently, the act of adding a virtual machine to a customer VM group configured to execute a particular type of customer workload entails a number of customer-specific configuration actions. Likewise, the herein described "load-balancing" operations also entail more than just re-directing jobs to different VM targets. Since each VM is specifically-configured with hardware and software characteristics to support a particular type of workload, re-allocating a VM to support a different workload type may entail wiping the machine and reprovisioning based on a different VM image.

FIG. 1 illustrates an example of a system 100 that provides dynamic autoconfiguration and autoscaling services for supporting workloads of customer-created applications on cloud resources. The system 100 include a customer device 118 (e.g., a personal or enterprise-owned computer) that interacts with a workload management provider network 102 over the internet to configure a group of virtual machines (e.g., customer VM group 104) to execute one or more customer-created applications.

In one implementation, a customer interacts with application creation software 120 on the customer device 118 to create a custom application, referred to herein as customer-created application 124. The application creation software 120 may be either locally-executed software that is executed by a web browser or software that is executed remotely to serve a customer with content through a web browser. In one implementation, the application creation software 120 communicates with a workload management provider network 102, using an API of the workload management provider network 102, to carry out various functions on behalf of the customer-created application 124.

The customer-created application 124 may, in various implementations, serve different purposes. By example, the application creation software 120 may be automation software that allows the customer to automate sequences of tasks that can each be performed manually by a user interacting with a desktop computer, such as by providing inputs to various applications and data resources accessible to the desktop computer. In one implementation, the application creation software 120 provides a development platform that allows the user to build source code designed to execute within a runtime environment with characteristics the same or similar to the customer device 118, such as a device having the same hardware characteristics (e.g., CPU), operating system, locally-installed applications and libraries, and/or configuration settings that provide the device with access to certain data resources (e.g., company files stored locally or on a virtual network).

To initially configure cloud-based virtual machines to execute the customer-created application, the customer device 118 initially provides certain information to a VM configuration engine 108 on the workload management provider network 102. In one implementation, the workload management provider network 102 is managed by a provider of the application creation software 120, and the application creation software 120 communicates an instance of the customer-created application 124 to the workload management provider network 102 during a sequence of set-up operations performed to ready the customer VM group 104 to execute different instances of the customer-created application 124 on different inputs. These different active instances of the customer-created application 124 are referred to herein as different "workloads."

As part of this set-up process, the customer navigates to a web portal 112 of the workload management provider network 102, creates and/or logs into a customer account, and provides parameters of the customer's computer device 118 and/or local network that are needed to create a suitable runtime environment for the customer-created application 124. In one implementation, the customer provides the workload management provider network 102 with a specified a virtual machine (VM) image 110 that is to be used to configure or all machines of the customer VM group 104.

The VM image 110 is, for example, a single file or software package which contains a virtual disk that has a bootable operating system installed on it. In one implementation, the VM image 110 includes a software stack and metadata specifying most or all characteristics needed to create a runtime-environment for the customer-created application 124. The software stack may, for example, include an operating system, preconfigured operations, libraries, containers, and other software, while the metadata represents other information that can assist in the deployment an execution of the VM image 110, such as by specifying specific support hardware (e.g., number of CPUs) and various configuration variables (e.g., IP address of host machine).

Notably, the VM image 110 may specify the various applications that are to be invoked by the customer-created application 124 to carry out various functionality defined by the application. For example, the customer-created application 124 may parse a user's inbox to look for a particular type of email "event" (e.g., a sale receipt), generate a shipping label by parsing certain data information from the email, and then reserve inventory, in which case, the VM image 110 includes an email client, a word processing application usable to create a shipping label, and an application used to access an inventory database.

In one implementation, the customer selects a VM image type for the VM image 110 from a drop-down menu available on the web portal 112. In another implementation, the customer obtains the VM image 110 from a virtual machine provider, such as Microsoft Azure, Amazon Web Services, or Google Cloud, and uploads the relevant package to the web portal 112. In other implementations, the user customer performs actions to physically create the VM image 110 such as by using a third-party service, such as Microsoft Azure®, that provides a web-based interface to allow the user specify hardware and software features to create a VM image.

In addition to the VM image 110, the customer may also provide the workload management provider network 102 with virtual network (VNet) parameters 116 that are usable to obtain access to data resources utilized by the customer-created application 124. For example, the VNet parameters 116 may include the customer's private address space, subnet name, subnet address range, delegation configuration, service endpoints and service endpoint policies, a Nat Gateway, and/or route table. In one implementation, the customer utilizes a third party Vnet configuration service, such as Microsoft Azure®, to initially configure the private Vnet and then delegates access to the workload management provider network 102 (e.g., the Microsoft Power Automate® network) and attaches configured the Vnet to the configuration of the VMs that are to be included within the customer VM group 104.

Notably, some customer-created applications may not need to access data resources of a private virtual network. In such cases, the customer may not provide the VNet parameters 116 to the web portal 112.

In FIG. 1, the customer additionally provides a configuration script 119 that automates a sequence of final configuration tasks that are to be performed after the VMs are provisioned based on the VM image 110 and with access to the customer's virtual network. For example, the configuration script 119 may perform actions such as logging into various customer accounts (e.g., a particular email account or database), installing and configuring additional software such as plug-ins not specified by the VM image, or performing machine and administration configuration tasks.

In some implementations, the customer may, during setup of the VM group, specify parameters relating to a number of virtual machines that are to execute different parallel instances of the customer-created application 124. For example, the customer may specify a maximum number of virtual machines that may concurrently execute instances of the customer-created application 124 and/or various "scale-up" or "scale-down" criteria indicating conditions that, when satisfied, trigger the dynamic addition or removal of one or more VMs from the customer VM group 104. In other implementation, the workload management provider network 102 sets the maximum number of virtual machines and/or the scale-up/scale-down criteria using default values.

Based on the inputs received through the web portal 112, a VM configuration engine 108 configures one or more virtual machines to execute the customer-created application 124. This group of virtual machines allocated to a single customer is collectively referred to herein as the customer VM group 104. For simplicity, FIG. 1 depicts the scenario where the customer creates a single application and all machines in the customer VM group 104 support workloads that execute instances of that application. In other implementations disclosed herein, the customer creates multiple different applications, and the customer VM group 104 is partitioned into subsets of machines that are each configured to support a corresponding one of the customer-created applications. An example of this type of scenario is discussed below with respect to FIG. 3.

Creating each machine of the customer VM group 104 includes booting the VM image 110 on the machine, installing the customer-created application 124 (if not included in the VM image 110), configuring the machine with the VNet parameters 116 (if specified by the customer) such that the resulting VM embodies the hardware and software characteristics defined by the virtual image 110 and has access to the customer's virtual network, and executing the configuration script 118 (if provided) to ready the VMs to receive workloads executable by the customer-created application 124.

After the customer VM group 104 is configured, an agent (not shown) on the customer device 118 submits workloads 114 to a workload manager 126 of the workload management provider network 102. In one implementation, each of the workloads 114 is submitted in association with the customer account to the workload management provider network 102. Each of the workloads 114 includes, for example, a different set of inputs to the customer-created application 124. If, for example, the customer-created application 124 performs a series of operations for finalizing a sale, each of the workloads 114 may include a sales invoice with applicable data fields such as items purchased, price, customer contact information, etc.

In various implementations, the workloads 114 may be submitted to the customer VM group 104 for execution in different ways. In one implementation, the customer configures the customer device 118 to submit a workloads automatically in response to a detected trigger event. For example, an agent (not shown) on the customer device 118 may be configured to submit a workload to the workload manager 126 each time a sale confirmation email is received, each time an entry is added to a database, or responsive to any other user-specified trigger event.

The workload manager 126 manages places each workload submitted by the customer device 118 into a workload queue 128 that is managed on behalf of the customer. The workload manager 126 selectively allocates the workloads pending in the queue to individual virtual machines in the customer VM group 104.

In various implementations, the VM configuration engine 108 performs configuration actions to support auto-scaling of the size of the customer VM group 104 and configuration actions to support load balancing by dynamically re-configuring different machines in the customer VM group 104 to support different types of customer workloads. A specific example of autoscaling is discussed in detail with respect to FIG. 2 while a specific example of load-balancing is discussed with respect to FIG. 3.

In effect, the system 100 provides the customer with a group of virtual machines that are specifically configured with the customer's requested hardware and software characteristics to support execution of the customer-created application 124 (or in some cases, multiple customer-created applications). The number of virtual machines in the group is dynamically scaled, with machines being automatically provisioned and de-provisioned, in proportion to processing needs of the customer. All of these operations occur seamlessly without requiring inputs from the customer at any time after the customer VM group 104 is initially configured. This auto-configuration saves the customer considerable time, especially in scenarios where large numbers of VMs are being leveraged in parallel and may also yield considerable cost savings since VMs are not tied up by allocations to inactive process types.

Figure 2:
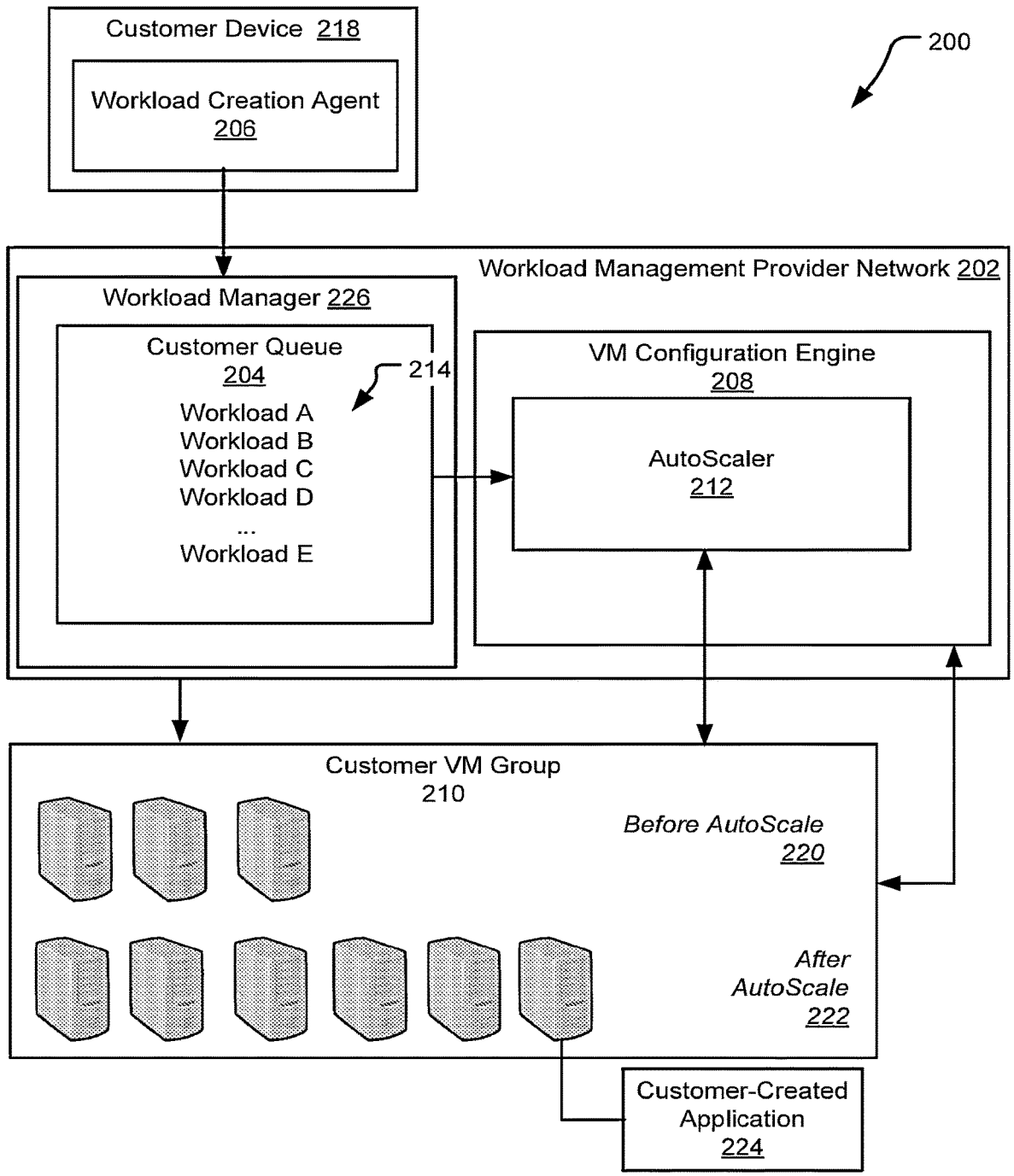
FIG. 2 illustrates an example system that provides cloud-hosted services to autoconfigure and auto scale groups of virtual machines to execute customer-created applications on customer workload.

FIG. 2 illustrates another example of a system 200 that provides cloud-hosted services to autoconfigure, maintain, and scale groups of virtual machines to execute customer workloads using customer-created applications. Consistent with the system of FIG. 1, the system 200 includes a workload management provider network 202 with a virtual machine (VM) configuration engine 208 that configures a customer VM group 210 on behalf on individual customer account with the workload management provider network 202.

In one implementation, an initial configuration of the customer VM group 210 is performed in a manner the same or similar as that described with respect to FIG. 1. For example, a customer device 218 provides a VM configuration engine 208 with a set of inputs collectively sufficient to create a target runtime environment on each VM in the customer VM group 210, where the "target runtime environment" in an environment in which a particular customer-created application 224 can be compiled and run to perform a given type of workload without error. These inputs include at least a VM image (not shown), a customer-created application (if not included in the VM image), and optionally, parameters of the customer's virtual network and a configuration script that is to be executed after all other aspects of the VM are configured to ready the machine to execute workloads by the customer-created application 224.

In the following examples, the term "workload" is used to refer to a set of processing operations collectively executable to achieve a common end goal, such as a sequence of processing operations executed by a same application, either in isolation by the application or by invoking functionality of other applications. For example, the workload may consist of operations to carry out a sale or to on-board a new employee. In contrast, the term "workload type" refers to a nature of the workload and the particular runtime environment in which the workload is executable. In this disclosure, it is assumed that workloads of different types are executed by different applications that individually require different runtime environments (e.g., with different software and/or hardware characteristics). In the systems disclosed herein, a different VM image is used to initialize VMs in support of each different workload type.

In FIG. 2, it is assumed that all VMs in the customer VM group 210 are configured to execute a same customer-created application (e.g., 224) that is associated with a first workload type. For example, the first workload type may be "sales" and the application may automate a sequence of processing operations that collectively effect a sale of a product or service. In other implementation, such as that shown in FIG. 3, different VMs in the customer VM group 210 may be configured based on different VM images so as to individually provide different runtime environments for executing different customer-created applications, each being associated with a unique workload type.

Based on the received VM image and other customer-provided inputs, the VM configuration engine 208 configures each of multiple VMs in a customer VM group 210 to execute the customer-created application 224 on a first type of workload.

The customer device 218 executes a workload creation agent 206 which is, for example, a locally-executing application that generates "workloads" and that submits the workloads for execution to a workload manager 228 which is, for example, a software module executing on a server of the workload management provider network 202. Notably, the customer device 218 that generates the workloads may be different from a customer device that provides the initial inputs to configure the customer VM group 210, such as when the customer is an entity with a number of different compute devices communicating with the workload management provider network 202 in association with a same customer account.

In one implementation, each workload submitted by the customer device 218 includes a set of inputs to the customer-created application 224 (e.g., the application that is installed on each VM in the customer VM group 210). Each workload may also be submitted in association with a "workload type" identifier (not shown) that identifies the specific customer-created application that is to be used to execute the workload.

The workload manager 228 queues the newly-received workloads from the workload creation agent 206 and selectively allocates, based upon VM availability, execution of each of the workloads 214 to a virtual machine in the customer VM group 210 that is configured to support the workload type. While the VMs in the customer VM group 210 are executing the workloads, an autoscaler 212 monitors the customer queue 204 and dynamically adds or removes VMs to the customer VM group 210 responsive to observing certain characteristics of the customer queue 204 that satisfy predefined "scale-up" or "scale-down" criteria.

In the above-described implementation, satisfaction of the "scale-up criteria" triggers the addition of more VMs to the customer VM group 210 and satisfaction of the "scale-down criteria" triggers the removal of VMs from the customer VM group 210. For example, VMs are added to the customer VM group 210 when length of the customer queue 204 exceeds a defined threshold, when an average pendency of the workloads 214 in the customer queue 204 exceeds a defined threshold, when a rate of the workloads 214 being received increases above a threshold, or other like criteria indicative of workload volume. The autoscaler 212 selectively removes (e.g., de-provisions) VMs in the customer VM group 210 responsive to observing certain characteristic(s) of the customer queue 204 that satisfy the scale-down criteria, such as when the length of the queue drops below a defined threshold, when an average pendency of the workloads 214 drops below a defined threshold, when the rate of the workloads 214 being received decreases below the threshold, etc.

According to one implementation, adding a VM to the customer VM group 210 entails the same or similar setup operations as those described with the initial configuration of the customer VM group 310 (e.g., creating a new VM according to the customer-provided VM image and various other provisioning operations to create the target runtime environment for the customer-created application 224). By example, FIG. 4 details an exemplary list of suitable provisioning and configuration actions to add a VM to the customer VM group 310.

Figure 4:
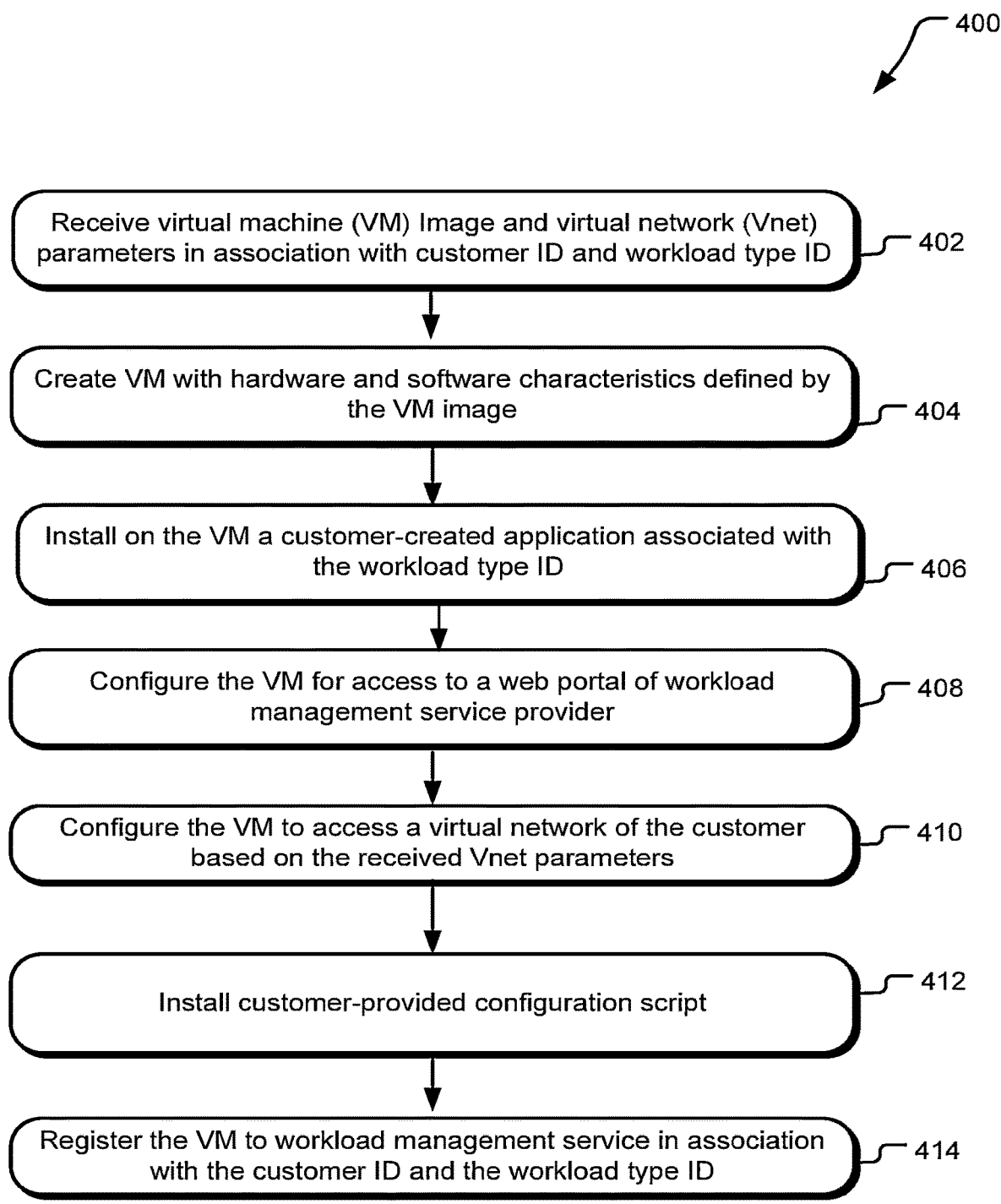
FIG. 4 illustrates example operations for provisioning a virtual machine to support a particular type of customer workload

In general, removing a VM from the customer VM group 210 entails disconnecting the VM from the customer account and wiping the VM so as to effectively remove all software and applications installed during the VM configurations process as well as any data and all configurations specified during the initial VM configuration process (e.g., effectively wiping all software and settings added to the VM during the operations shown in the FIG. 4 flowchart), such that the corresponding resource can be subsequently reconfigured (from scratch) to serve the same or another customer.

In the example of FIG. 2, the customer VM group 210 is shown at two different times 220 and 222, corresponding to times just before and just following a scale-up operation of the autoscaler 212. In this example, there are initially three VMs dedicated to supporting a first workload type associated with the customer-created application 224, which is installed on each of the three VMs initially in the customer VM group 210. The autoscaler 212 detects that, over the course of a given timeframe (e.g., a few days, a week, a month), an average number of jobs pending in the customer queue 204 at has increased by factor satisfying a defined "scale-up" threshold. For example, the average number of pending workloads may have doubled due to a seasonal uptick in sales activity. Based on the threshold and/or a rate of increase in submitted number of workloads, the autoscaler 212 identifies a set number of VMs to add to the customer VM group 210 to support the first workload type.

In the above example where the rate of workload submission has doubled, the autoscaler 212 elects to double the size of the customer VM group 210 and to configure each of the new VMs to support the first type of workload. In this case, the VM configuration engine 208 configures three additional new VMs in a manner identical to the initial configuration of the other machines in the customer VM group 210 supporting the first workload type. These newly-configured VMs are added to the customer VM group 210 and the workload manager 228 then begins allocating workloads if the first workload type from the customer queue 210 to the newly-configured VMs.

In the above example, the autoscaler 212 may subsequently elect to remove one or more VMs from the customer VM group 210 responsive to observing a decrease in the rate of workload submission of the first workload type to the customer queue 204 satisfying a set threshold or responsive to observing other queue characteristic(s) that satisfy scale-down criteria, as detailed above.

In various implementations, the autoscaler 212 may implement different scale-up and scale-down allocation rules defined either by the workload management provider network 202 or by the customer. In one implementation, the customer specifies, during an initial setup process, a initial number of VMs to include in the customer VM group 210 and a maximum number of VMs that are to be permitted at any given time. The customer may also, in some implementations, specify thresholds and other criteria suitable to trigger "scale-up" and "scale-down" operations of the autoscaler 212.

Figure 3:
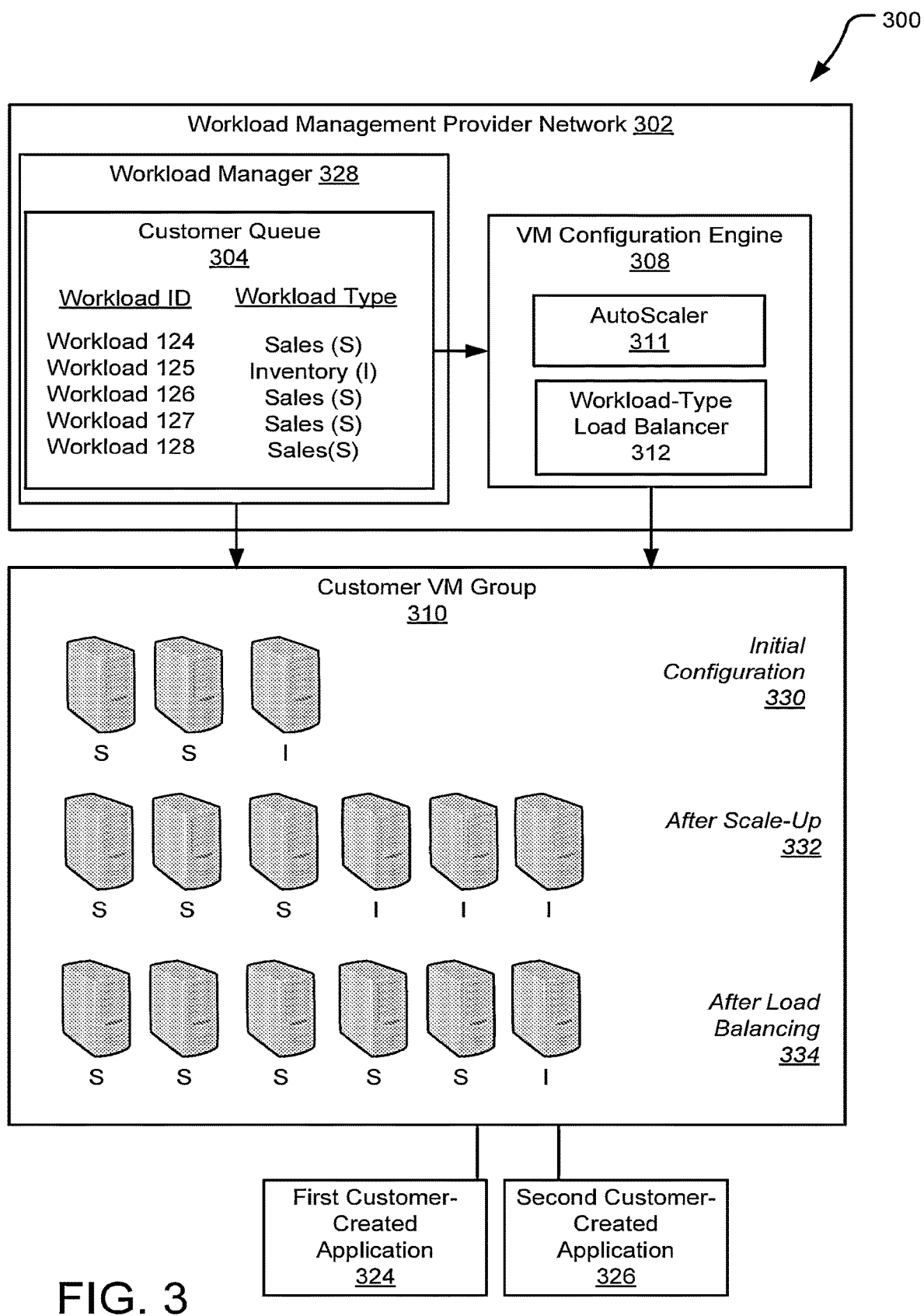
FIG. 3 illustrates another example system that provides cloud-hosted services to autoconfigure, auto scale, and load-balance groups of virtual machines to support cloud execution of customer-created applications.

If the customer is charged for resource usage based on the number of VMs that the customer actually uses during a given billing cycle, this scale-up/scale-down functionality provides the customer with significant cost savings at times when there are fewer workloads being executed while also providing seamless flexibility to support larger numbers of workloads during the customer's seasonally busy times, all without requiring the customer to provide any additional information or to perform affirmative action(s) to trigger the "scale-up" or "scale-down" operations. Beneficially, computing resources that the customer is not using at a given point in time can be temporarily allocated to other customers, reducing total power consumption of the workload management provider network 202.

illustrates another example system 300 that provides cloud-hosted services to autoconfigure, auto scale, and load-balance groups of virtual machines to support cloud execution of customer-created applications. The example of FIG. 3 differs from FIG. 2 in that the system 300 provides auto-scaling and load-balancing support for different workload types within a customer VM group 310. At any given time, each machine in the customer VM group 310 is configured to support a single "workload type," where each different workload type uniquely identifies a corresponding one of multiple customer-created applications that the customer has provided to a workload management provider network 302 for executing customer workloads using cloud resources. In the example of FIG. 3, the customer creates two custom applications, a first customer-created application 324 and a second customer-created application 326, each including functional code for carrying out two different types of workloads. The same concepts described herein with respect to the scaling and load-balancing of two customer workloads can be extended to support any number of customer workload types in excess of two.

In FIG. 3, the first customer-created application 324 is designed to support a workload type that the customer has named "sales" (or S, abbreviated) while the second customer-created application 326 is designed to support another workload type that the customer has named "inventory" (or I, abbreviated). Workloads that are of the Type-S define inputs to the first customer-created application 324, which executes a set of processing operations that collectively effect a sale, such as operations such processing a payment transaction, creating a shipping label, putting a hold on inventory, placing a ship request with a warehouse storing the inventory, and emailing a receipt. Likewise, workloads that are of the Type-I define inputs to the second customer created application 326, which executes a set processing operations relating to inventory management, such as operations to order new inventory for a sales enterprise, update database inventory totals, effect distribution of the inventory among different warehouses, a, etc.

In the example of FIG. 3, it is assumed that each of the first customer-created application 324 and the second customer-created application 326 are associated with different workload types and designed to execute in runtime environments with different software characteristics, different hardware characteristics, and/or different device configuration settings. During an initial set-up process for the VM customer group 310, the customer specifies a first VM image that defines a set of software and hardware characteristics sufficient to create the runtime environment for the first customer-created application and also specifies a second VM image that defines a set of software and hardware characteristics sufficient to create the runtime environment for the second customer-created application 326. The VM configuration engine 308 assigns a first workload type identifier (e.g., "S") to the first VM image and the first customer-created application 324 and a second workload type identifier (e.g., "I") to the second VM image and the second customer-created application 226.

During initial setup of the customer VM group 310, the customer may be provided with an option to select certain VM allocation parameters such as an initial and/or maximum number of VMs to include in the VM customer group 310 as well as an initial selection of how many of these machines to dedicate to each of the different workload types (e.g., Type-S workload or Type-I workload). If, for example, the customer's business processes thousands of the Type-S workload per day and less than 100 of the Type-I workload per day, the customer may elect to dedicate 90% of the VMs in the customer VM group to support of the Type-S workload and the remaining 10% to support the Type-I workload. In cases where the customer does not specify this workload type allocation, the allocation may be determined based on default values, such as by dividing the customer VM group 310 into equally-sized subsets that each respectively support a corresponding one of the different customer's workload types.

The VM configuration engine 308 provisions and configures each VM in the customer VM group 310 based on a select one of the different VM images that the customer has specified. In the following example, VMs configured to support the first workload type are referred to as "type-S VMs" while VMs configured to support the second workload type are referred to as "type-I VMs."

Provisioning of type-S VM includes, for example, installing the operating system and applications specified by the first VM image, installing the first customer-created application 224, configuring the VM for access to the customer's local network (or one of multiple local networks used by the customer to support type 'S' workloads) and configuring the VM with access to various accounts (e.g., an account to the workload management provider network 302 and to other cloud-based application providers supporting applications with APIs potentially invoked by first customer-created application 324). Likewise, provisioning each type-I VM includes, for example, installing the operating system and applications specified by the second VM image, installing the second customer-created application 224, configuring the VM for access to the customer's local network and various customer accounts. Notably, FIG. 4 illustrates a sequence of operations usable to configure a virtual machine to support a workload of a given workload type (e.g., type-S or type-I).

Other aspects of VM configuration not specifically disclosed with respect to FIG. 3 may be assumed the same or similar to other implementations described herein.

During ongoing workload management operations, device(s) of a customer generates and submit workloads of the first workload type and of the second workload type to a workload manager 328 of the workload management provider network 302 in association with the customer's account. Each submitted workload includes a workload type identifier (e.g., S or I) identifying the specific customer-created application (e.g., 324 or 326) that is to be used to execute the workload. The workload manager 228 queues the workloads and selectively allocates the workloads of each workload type to a VM in the customer VM group 310 that is configured to support the workload type. For example, the workload manager 328 determines that a first queued workload ("workload 124") is a Type-S workload and assigns the workload to one of the Type-S VMs for execution. Likewise, the workload manager 328 determines that a second queued workload ("workload 125") is a Type-I workload and assigns the workload to one of the Type-I VMs for execution.

In FIG. 3, the VM configuration engine 308 is shown to include both an autoscaler 311 and a workload-type load balancer 312. Consistent with the description of FIG. 2, the autoscaler 311 performs operations to add additional VMs to the customer VM group 310 and/or to remove VMs to the customer group 310 based on predefined scale-up and scale-down criteria. However, in the example of FIG. 3, the VMs added and removed are individually configured to support one of multiple different workload types. Both Type-S VMs and Type-I VMs can be dynamically added to and removed from the customer VM group 310 in response to the ebb and flow in the volume (e.g., number) of each corresponding type of workload (S or I) in the customer queue 304.

In one implementation, the autoscaler 311 is preconfigured with scale-up and scale-down criteria defining rules that can be evaluated to determine when to add and subtract VMs in support of each of the customer's different workload types. For example, one rule may specify that a type-S VM is to be added for each 500 additional Type-S workloads that are, on average, received per day over the course of a week. If, during a first week, there are 2000 Type-S workloads being received on average each day, the autoscaler 311 may initially ensure that there are four type-S VMs configured (e.g., one type-SVM per 5000 type-S workloads). If the average number of type-S VMs then increases by an additional 1000 workloads the next week, the autoscaler 311 may, in this case, determine that an additional two type-S VMs are to be added to the customer VM group. Different scale-up and scale-down criteria may be set for managing scale-up and scale down actions associated with each type of workload.

In contrast to the auto-scaler 311, the workload-type load balancer 312 performs operations to re-allocate existing VMs in the customer VM group 310 to support different workload type(s), such as in response to the ebb and flow in a ratio of those workload types in the customer queue 304. More specifically, the workload-type load balancer 312 performs workload type balancing among machines in a customer VM group at times when (1) the customer VM group already includes a set maximum number of VMs and (2) when there is a shift in a ratio of the queued jobs that satisfies re-allocation criteria.

In a simple example, workload-type load balancing is performed such that the number of VMs in the customer group 310 remains constant while the number of VMs of each type (S-type or I-type) in the group is, at any given time, proportional to the number of workloads in the customer queue 304 of the associated type. Assume, for example, the customer has specified a maximum number of 6 VMs in the customer VM group and all VMs are currently configured to support either the type-S workload or the type-I workload. If the ratio of type-S workloads to type-I workloads in the customer VM group 310 suddenly shifts from 50/50 to 90/10 (e.g., due to holiday shopping the month of December), the average queue pendency of the type-S workloads may increase dramatically because there are fewer machines configured to support a much larger total volume of workloads. Yet, if the maximum number of VMs are already allocated, it is not permissible to add additional VMs to the customer VM group to support the increase in type-S workloads. In this case, it may be desirable to de-provision one or more of the type-I VMs and re-provision this VM as a type-S VM to ensure that the average queue pendency of the type-S workloads is kept below a predefined acceptable limit.

Workload-type load balancing operations such as that described above may be performed according to various default or customer-specified re-allocation criteria (e.g., rules).

The example of FIG. 3 illustrates how auto-scaling the size of the customer VM group 310 and load balancing workload types between the VMs in the customer VM group 310 can act in a complementary manner to maximize utilization of a fixed set of resources in accord with defined set of workload-specific objectives, such as allocation rules specifying workload-type preferences, target throughput values (e.g., average pendency or queue length for workload type), etc.

In the specific example shown in FIG. 3, the customer VM group 310 is shown at three different times 330, 332, and 334. It is assumed that during an initial set-up operation, the customer defined "a maximum number of total VMs" for the customer VM group 310 to be '6'. In the FIG. 3 example it is also assumed that the autoscaler 311 and workload-type load balancer 312 implements a set of VM allocation rules dictating how many VMs of each workload type to allocate at a given time based on one or more observable characteristics of the customer queue 304, such as a ratio of number of pending workloads of each different workload type, the average queue pendency associated with each of the workload type(s), a rate of workloads being received for each different workload type, etc.

For example, one VM allocation rule may specify that the autoscaler 311 is to add type-S VMs as necessary, until the customer VM group 310 is at the maximum size, to ensure that the average pendency of each type-S workload remains under a fixed target, such as 5 minutes. Another VM allocation rule may specify an exception to the former rule that permits the average pendency of the type-S workload to drop to 10 minutes at times when the customer VM group 310 is already at the maximum size. However, if the average pendency of the type-S workload spikes above 10 minutes while the customer VM group 310 is at the maximum size, the allocation rules provides for de-provisioning one or more of the type-I VMs and re-provisioning those VMs to support the type-S workload. The same or different allocation rule(s) may be set in association with the Type-I of workload.

Referring again to the example of FIG. 3, a time 330 ("initial configuration") illustrates an initial configuration of the customer VM group 310 in which there are two type-S VMs and one type-I VM. Between the time 330 and a subsequent time 332 ("after scale-up"), there is an increase in the number of both types of workloads being received in the customer queue 304. Based on the existing workload allocation rules, the autoscaler 311 decides to add one additional type-S VM and two additional type-I VMs. At this point in time, the number of VMs in the customer VM group 310 equals the initially set "maximum number of total VMs" variable.

Between the time 332 and another subsequent time 334, the rate of incoming type-I workloads has remained relatively constant but there has been a further increase in the rate of incoming type-S workloads, effecting a shift in a ratio of queued jobs of the first workload type and of the second workload type. It is assumed, in this example, that the magnitude of this shift satisfies a re-allocation criteria of the workload-type load balancer 312. In this case, the workload-type load balancer 312 de-provisions two of the type-I VMs and provisions two new type-S VMs for addition to the customer VM group 310. If, at a future point in time (not shown), the ratio of queued workloads of the first and second workload types shifts in the opposite direction such that there is a relative decrease in the number of type-S workloads being received as compared to the number of type-I workloads, the workload-type load balancer 312 may likewise de-provision one or more of the type-S VMs and configure those machines to instead support the type-I workload.

Through the above operations, the customer VM group 310 is automatically scaled in size in response to workload demand and the VMs within the customer VM group 310 are dynamically de-provisioned and re-provisioned in support of different workload types in response to shifts in an observed ratios of the workload types being received in the customer queue 304.

FIG. 4 illustrates example operations 400 for provisioning a virtual machine to support a particular type of customer workload. In one implementation, the operations 400 are performed to add a new VM to customer VM group whenever characteristics of a customer workload queue satisfy predefined "scale-up" criteria, as generally described with respect to FIG. 3. In another implementation, the operations 400 are performed when load-balancing workloads of different types among available VMs in a customer VM group, as generally described with respect to FIG. 3.

A receiving operation 402 receives a VM image and virtual network parameters in association with a customer ID and Workload Type I. The customer ID identifies a particular customer account with a workload management service provider while the workload type ID identifies a customer-defined "workload type" that is to be supported by VMs configured based on the received VM image. A VM creation operation 404 creates a virtual machine with hardware and software characteristics defined by the VM image.

An installation operation 406 installs a customer-created application that executes workloads of the customer-defined workload type (e.g., the workload type associated with the workload type ID received at 402). In some implementations, the customer-created application is specified as part of the VM image. In other implementations, the customer-created application is specified by the customer as an input that is separate from the VM image. The VM image defines a set of applications that are to be installed to create the runtime environment for the customer-created application.

A configuration operation 408 configures the VM for access to a web portal of the workload management service provider. In one implementation, the web portal provides the VM with access to a customer queue (e.g., customer queue 204 or 304).

A configuration operation 410 configures the VM to access a virtual network of the customer using the Vnet parameters received in receiving operation 402, effectively providing the VM with access to customer resources that may be accessed during execution of workloads of the workload type. An installation operation 412 installs a customer-provided configuration script that automates a sequence of final configuration tasks to ready the VM to execute workloads of the workload type. For example, the configuration script may perform actions such as logging into various customer accounts (e.g., a particular email account or database), installing plug-ins not specified by the VM image, or other configuration tasks.

A registration operation 414 registers the VM to the workload management service provider in association with the customer ID and workload type ID, effectively providing the workload management service provider with access to the VM (e.g., so the workload management service provider can allocate workloads to the VM that are received in the customer queue associated with the customer ID).

Figure 5:
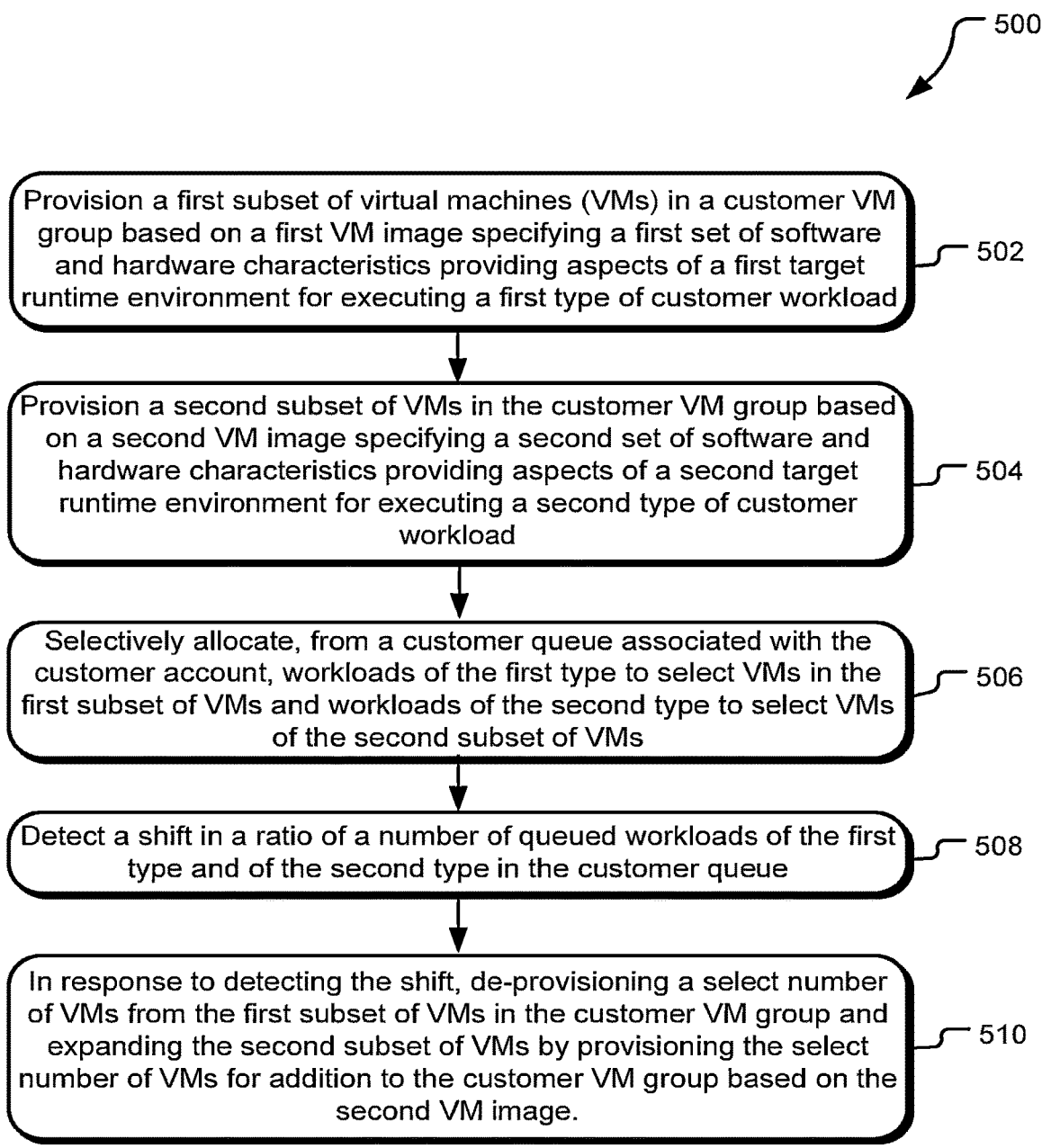
FIG. 5 illustrates example operations or workload-type load balancing among VMs of a customer VM group

FIG. 5 illustrates example operations 500 for workload-type load balancing among VMs of a customer VM group. A first provisioning operation 502 provisions a first subset of VMs in the customer VM group based on a first VM image specifying a first set of software and hardware characteristics providing aspects of a first target runtime environment for a first type of customer workload specified in association with a customer account. A second provisioning operation 504 provisions a second subset of VMs in the customer VM group based on a second VM image specifying a second set of software and hardware characteristics providing aspects of a second target runtime environment for a second type of customer workload specified in association with the customer account.

An allocation operation 506 selectively allocates, from a customer queue associated with the customer account, workloads of the first type to select VMs in the first subset of VMs and workloads of the second type to select VMs of the second subset of VMs.

A detection operation 508 detects a shift in a ratio of a number of queued workloads of the first type and of the second type in the customer queue. In one implementation, the detection operation occurs when the customer VM group includes a set maximum number of VMs (meaning it is impermissible to add VMs to the group) and the shift in the ratio is of a magnitude large enough to satisfy pre-defined re-allocation criteria.

A re-allocation operation 510 re-allocates VMs within the customer group in response to the detection operation 508. Specifically, the re-allocation operation 510 de-provisions a select number of VMs from the first subset of VMs and expands the second subset of VMs by provisioning the select number of VMs for addition to the customer group based on the second VM image. In this case, the total number of VMs in the customer VM group remains unchanged before and after the re-allocation operation 510 but the customer VM group is load-balanced in the sense that it now has greater capability to handle an increase in volume of workloads of the second type. Another allocation operation (not shown) allocates select workloads of the second type pending in the customer queue to the newly-provisioned VMs added to the customer VM group.

In addition to the operations shown in FIG. 5, some implementations further provide for dynamically adding and subtracting VMs to the customer VM group (e.g., effectively changing the number of active machines in the VM group) in response to determining that contents of the customer queue satisfy predefined scale-up and scale-down criteria.

Figure 6:
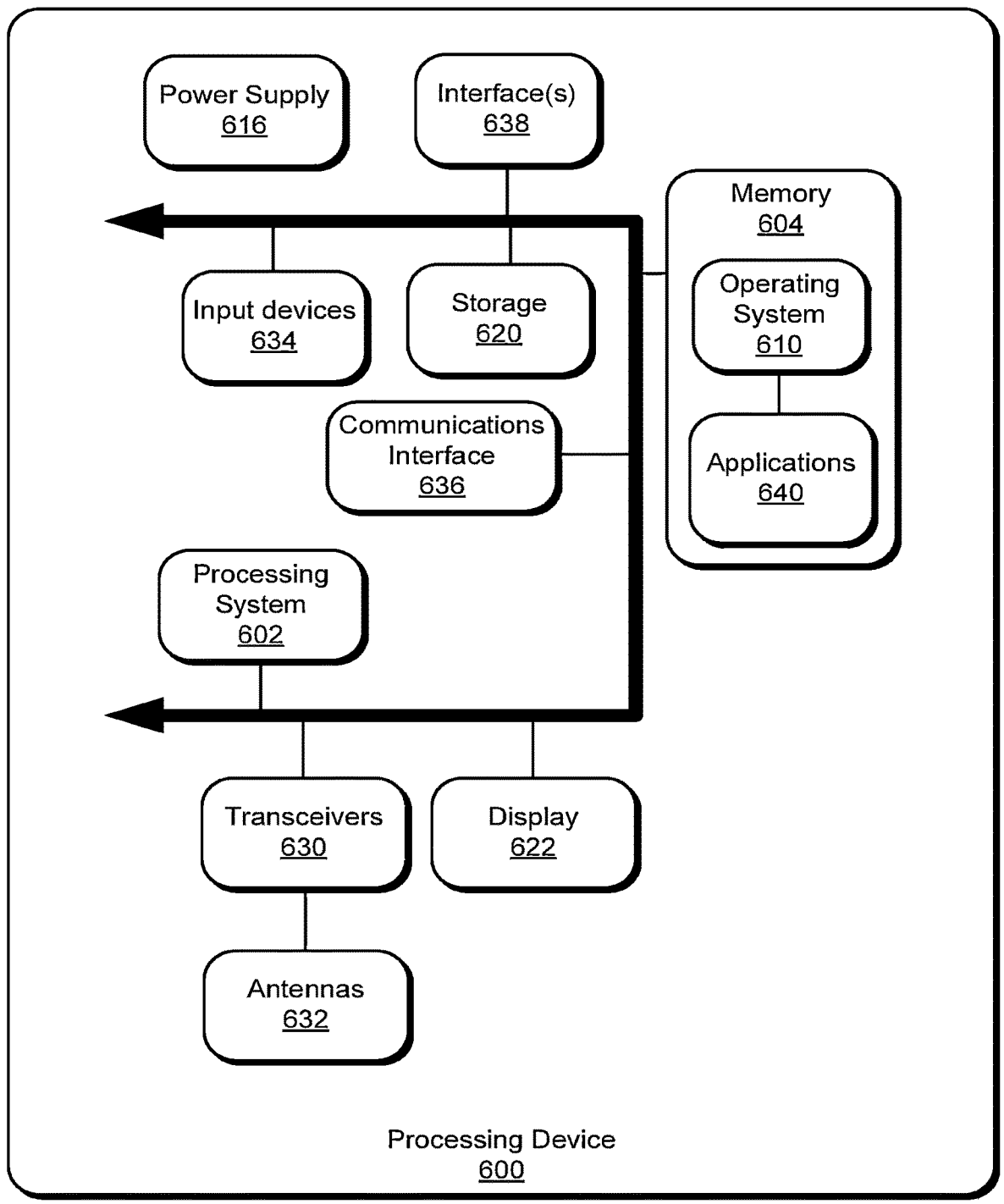
FIG. 6 illustrates an example schematic of a processing device suitable for implementing aspects of the disclosed technology.

FIG. 6 illustrates an example schematic of a processing device 600 suitable for implementing aspects of the disclosed technology. In one implementation, the processing device 600 is a user device that interacts with workload management provider network (e.g., workload management provider network 102 of FIG. 1). In another implementation, the processing device 600 is a server hosting aspects of a workload manager (e.g., workload manager 126 of FIG. 1), VM configuration engine (e.g., VM configuration engine 108 of FIG. 1) or a server hosting one or more VMs in a customer VM group (e.g., customer VM group 104 of FIG. 1).

The processing device 600 includes a processing system 602, memory device(s) 604, the display 606, and other interfaces 608 (e.g., buttons). The memory device(s) 604 generally includes both volatile memory (e.g., RAM) and non-volatile memory (e.g., flash memory). An operating system 610 may reside in the memory device(s) 604 and be executed by the processing system 602. One or more applications 612, such as a workload manager, VM configuration engine, or a customer-created application (e.g., customer-created application 124) may be loaded in the memory and executed on the operating system 610 by the processing system 602.

The processing device 600 includes a power supply 616, which is powered by one or more batteries or other power sources and which provides power to other components of the processing device 600. Additionally, the processing device 600 includes one or more communication transceivers 630 and an antenna 632 to provide network connectivity (e.g., a mobile phone network, Wi-Fi®, BlueTooth®). The processing device 600 may be further coupled to various input devices 534 such as a microphone, keyboard, touch display, etc. In an implementation, an installation script generation engine, along with other various applications and other modules and services, are embodied by instructions stored in memory device(s) 604 and/or storage devices 628 and processed by the processing system 602. The memory device(s) 604 may be memory of host device or of an accessory that couples to a host. The installation script generation engine my include a trained multi-layer neural network that is saved in the memory device(s) 604 or saved in memory of one or more other compute devices (e.g., various interconnected processing nodes) that are communicatively coupled to the processing device 600, such as via the internet.

The processing device 560 may include a variety of tangible computer-readable storage media and intangible computer-readable communication signals. Tangible computer-readable storage can be embodied by any available media that can be accessed by the processing device 600 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 600. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one implementation, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The following summary provides a non-exhaustive set of illustrative examples of the technology set forth herein.

The following summary provides a non-exhaustive set of illustrative examples of the technology set forth herein. According to a first aspect, some implementations include a method managing customer workloads in the cloud. The method includes provisioning a first subset of virtual machines (VMs) in a customer VM group associated with a customer account based on a first VM image and provisioning a second subset of VMs in the customer VM group based on a second VM image. The first VM image specifies a first set of software and hardware characteristics providing aspects of a first target runtime environment for a first type of customer workload and the second VM image specifies a second set of software and hardware characteristics providing aspects of a second target runtime environment for a second type of customer workload. The method provides for selectively allocating, from a customer queue associated with the customer account, workloads of the first type to select VMs in the first subset of VMs and workloads of the second type to select VMs of the second subset of VMs. In response to detecting a shift in a ratio of a number of queued workloads of the first type and of the second type in the customer queue, a select number of VMs from the first subset of VMs in the customer VM group are de-provisioned the second subset of VMs is expanded by provisioning the select number of VMs for addition to the customer VM group based on the second VM image.

According to another aspect, the method further provides for dynamically adding additional virtual machines to the customer VM group in response to determining that contents of the customer queue satisfy predefined scale-up criteria. Each of the additional VMs is provisioned based on a select one of the first VM image or the second VM image and allocated select workloads pending in the customer queue.

According to another aspect, provisioning the VMs of either the first subset of virtual machines or the second subset of virtual machines includes configuring each of the VMs for access to a virtual network of the customer based on user-specified Vnet access parameters.

According to still another aspect of any of the above methods, each of the first VM image and the second VM image specifies an operating system as well as one or more applications to be executed by the operating system.

According to still another aspect, the first target runtime environment is a target runtime environment for a first customer-created application and the second target runtime environment is a target runtime environment for a second customer-created application.

In still yet another method of any of the preceding methods, the predefined scale-up criteria is satisfied when a number of workloads pending in the queue exceeds a threshold.

According to yet another method of any of the preceding methods, the predefined scale-up criteria is satisfied when an average pendency of a workload in the queue exceeds a defined threshold.

In another method of any of the preceding methods, the de-provisioning is performed further in response to determining that a size of the customer VM group is equal to customer-specified maximum size parameter.

In another aspect, some implementations include a computing system managing customer workloads in the cloud. The computing system includes hardware logic circuitry that is configured to perform any of the methods described herein.

In yet still another aspect, some implementations include a computer-readable storage medium for storing computer-readable instructions. The computer-readable instructions, when executed by one or more hardware processors, perform any of the methods described herein.

According to another aspect, some implementations include a system for managing customer workloads in the cloud. The system includes a means for provisioning a first subset of VMs in a customer VM group associated with a customer account based on a first VM image and provisioning a second subset of VMs in the customer VM group based on a second VM image. The first VM image specifies a first set of software and hardware characteristics providing aspects of a first target runtime environment for a first type of customer workload and the second VM image specifies a second set of software and hardware characteristics providing aspects of a second target runtime environment for a second type of customer workload. The system further includes a means for selectively allocating, from a customer queue associated with the customer account, workloads of the first type to select VMs in the first subset of VMs and workloads of the second type to select VMs of the second subset of VMs. The system further includes a means for de-provisioning select number of VMs from the first subset of VMs in the customer VM group in response to detecting a shift in a ratio of a number of queued workloads of the first type and of the second type in the customer queue. The system furthers includes a means for expanding the second subset of VMs by provisioning the select number of VMs for addition to the customer VM group based on the second VM image.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method comprising:
provisioning one or more virtual machines (VMs) of a first type in a customer VM group associated with a customer account based on a first VM image specifying a first set of software and hardware characteristics providing aspects of a first target runtime environment for a first type of customer workload;
provisioning one or more VMs of a different second type in the customer VM group based on a different second VM image specifying a different second set of software and hardware characteristics providing aspects of a different second target runtime environment for a different second type of customer workload;
selectively allocating, from a customer queue associated with the customer account, customer workloads of the first type to one or more select VMs of the first type and customer workloads of the different second type to one or more select VMs of the different second type; and
in response to an increase in a ratio of a number of queued customer workloads of the first type to the different second type in the customer queue that occurs while a number of VMs in the customer VM group is equal to a maximum permissible number, de-provisioning one or more VMs of the different second type in the customer VM group and re-provisioning the one or more VMs in the customer VM group as one or more VMs of the first type, wherein the re-provisioning includes configuring the one or more VMs of the first type to support the customer workload of the first type.

2. The method of claim 1, further comprising:
in response to contents of the customer queue satisfying predefined scale-up criteria, dynamically adding additional VMs to the customer VM group and provisioning each of the additional VMs based on a select one of the first VM image or the different second VM image; and
allocating select customer workloads pending in the customer queue to the additional VMs added to the customer VM group.

3. The method of claim 2, wherein provisioning the additional VMs includes:
configuring each of the additional VMs for access to a virtual network of the customer based on user-specified Vnet access parameters.

4. The method of claim 2, wherein the predefined scale-up criteria is satisfied when a number of customer workloads pending in the customer queue exceeds a threshold.

5. The method of claim 2, wherein the-predefined scale-up criteria is satisfied when an average pendency of a workload in the customer queue exceeds a defined threshold.

6. The method of claim 1, wherein each of the first VM image and the different second VM image specifies an operating system and one or more applications to be executed by the operating system.

7. The method of claim 1, wherein the first target runtime environment is a target runtime environment for a first customer-created application and the different second target runtime environment is a target runtime environment for a second customer-created application.

8. The method of claim 1, wherein the de-provisioning is performed further in response to a size of the customer VM group being equal to customer-specified maximum size parameter.

9. A system comprising:
one or more hardware processors;
a workload manager stored in memory and executable by the one or more hardware processors to selectively allocate, from a customer queue associated with a customer account, customer workloads of a first type to one or more virtual machines (VMs) of a first type in a customer VM group and workloads of a different second type to one or more VMs of a different second type in the customer VM group;
a virtual machine (VM) configuration engine stored in the memory and executable by the one or more hardware processors to:
provision the one or more VMs of the first type in the customer VM group based on a first VM image specifying a first set of software and hardware characteristics providing a first target runtime environment for a first customer created-application that executes workloads of the first type;
provision the one or more VMs of the different second type in the customer VM group based on a different second VM image specifying a different second set of software and hardware characteristics providing a different second target runtime environment for a different second customer created-application that executes workloads of the different second type; and
in response to an increase in a ratio of a number of queued customer workloads of the first type to the different second type in the customer queue that occurs while a number of VMs in the customer VM group is equal to a maximum permissible number, de-provision one or more VMs of the different second type in the customer VM group and re-provision the one or more VMs in the customer VM group as one or more VMs of the first type, wherein the re-provisioning includes configuring the one or more VMs of the first type to support the customer workload of the first type.

10. The system of claim 9, wherein the VM configuration engine is further configured to:
dynamically add additional VMs to the customer VM group and provision each of the additional VMs based on a select one of the first VM image or the different second VM image in response to contents of the customer queue satisfying predefined scale-up criteria; and
allocate select customer workloads pending in the customer queue to the additional VMs added to the customer VM group.

11. The system of claim 10, wherein the VM configuration engine configures each additional VM to access to a virtual network of the customer based on user-specified Vnet access parameters.

12. The system of claim 10, wherein the predefined scale-up criteria is satisfied when a number of workloads pending in the customer queue exceeds a threshold.

13. The system of claim 10, wherein the predefined scale-up criteria is satisfied when an average pendency of a workload in the customer queue exceeds a defined threshold.

14. The system of claim 9, wherein each of the first VM image and the different second VM image specifies an operating system and one or more applications to be executed by the operating system.

15. The system of claim 9, wherein the VM configuration engine includes an AutoScaler and a Workload-Type Load Balancer.

16. The system of claim 9, wherein the VM configuration engine de-provisions the select number of VMs in response to a size of the customer VM group being equal to a customer-specified maximum size parameter.

17. One or more tangible computer-readable storage media encoding processer-readable instructions for executing a computer process, the computer process comprising:
provisioning one or more virtual machines (VMs) of a first type in a customer VM group associated with a customer account based on a first VM image specifying a first set of software and hardware characteristics providing a first target runtime environment for a first type of customer workload;
provisioning one or more VMs of a different second type in the customer VM group based on a different second VM image specifying a different second set of software and hardware characteristics providing a different second target runtime environment for a different second type of customer workload;
selectively allocating, from a customer queue associated with the customer account, customer workloads of the first type to one or more select VMs of the first type and workloads of the different second type to one or more select VMs of the different second type;
in response to an increase in a ratio of a number of queued customer workloads of the first type to the different second type in the customer queue that occurs while a number of VMs in the customer VM group is equal to a maximum permissible number, de-provisioning one or more VMS of the different second type in the customer VM group and re-provisioning the one or more VMs in the customer VM group as one or more VMs of the first type, wherein the re-provisioning includes configuring the one or more VMs of the first type to support the customer workload of the first type.

18. The one or more tangible computer-readable storage media of claim 17, further comprising:
  in response to contents of the customer queue satisfying predefined scale-up criteria, dynamically adding additional VMs to the customer VM group and provisioning each of the additional VMs based on a select one of the first VM image or the different second VM image; and
  allocating select customer workloads pending in the customer queue to the additional VMs added to the customer VM group.

19. The one or more tangible computer-readable storage media of claim 17, wherein each of the first VM image and the different second VM image specifies an operating system and one or more applications to be executed by the operating system.

20. The one or more tangible computer-readable storage media of claim 17, wherein the first target runtime environment is a target runtime environment for a first customer-created application and the different second target runtime environment is a target runtime environment for a second customer-created application.

* * * * *